US005606147A

United States Patent [19]
Deschamps et al.

[11] Patent Number: 5,606,147
[45] Date of Patent: Feb. 25, 1997

[54] ELECTRICAL OUTLET BOX FOR HANGING AN ELECTRICAL FIXTURE

[75] Inventors: Bernard F. Deschamps; Henry J. Macuga, both of Ware, Mass.; Stuart S. Cox, Tallahassee, Fla.

[73] Assignee: Eclipse Manufacturing, Inc., Ware, Mass.

[21] Appl. No.: 227,546

[22] Filed: Apr. 14, 1994

Related U.S. Application Data

[63] Continuation-in-part of Ser. No. 889,921, Jun. 3, 1992, Pat. No. 5,303,894.

[51] Int. Cl.$^6$ .................................................. H02G 3/08
[52] U.S. Cl. .......................... 174/48; 174/63; 220/3.7; 248/343; 248/906
[58] Field of Search ................. 174/48, 61, 63, 174/58, 54, 57; 220/3.2, 3.7, 3.8, 3.9, 3.92; 248/343, 906; 411/433

[56] References Cited

U.S. PATENT DOCUMENTS

| | | | |
|---|---|---|---|
| 3,597,889 | 8/1971 | LoNigro | 52/28 |
| 3,676,570 | 7/1972 | Gabb | 174/61 |
| 4,621,992 | 11/1986 | Angott | 417/572 |
| 4,909,405 | 3/1990 | Kerr, Jr. | 220/3.9 |
| 4,919,292 | 4/1990 | Hsu | 220/3.2 |
| 5,166,476 | 11/1992 | Stumm | 174/65 R |

*Primary Examiner*—Kristine L. Kincaid
*Assistant Examiner*—Dean A. Reichard
*Attorney, Agent, or Firm*—Popham, Haik, Schnobrich & Kaufman, Ltd.

[57] ABSTRACT

An outlet box for mounting a fixture, such as a fan or a light, from a ceiling. Adjustable hanger screw mountings permit the mounting of a wide variety of fixtures to the box. Adjustability is attained by attaching the hanger screw mountings to the ends of a mounting arm which is pivotally connected to a top plate of the outlet box.

24 Claims, 5 Drawing Sheets

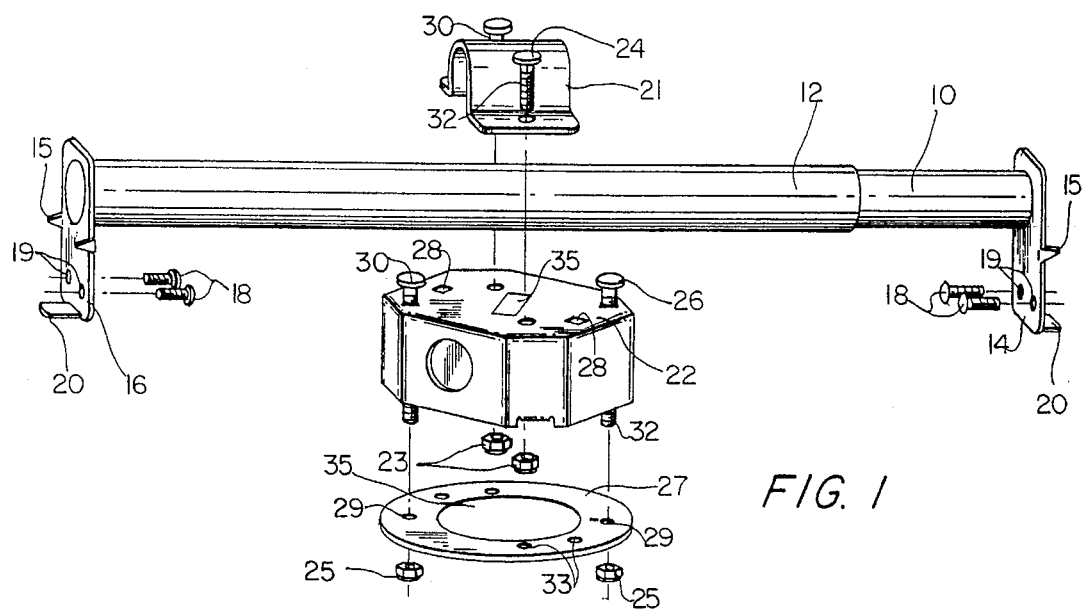
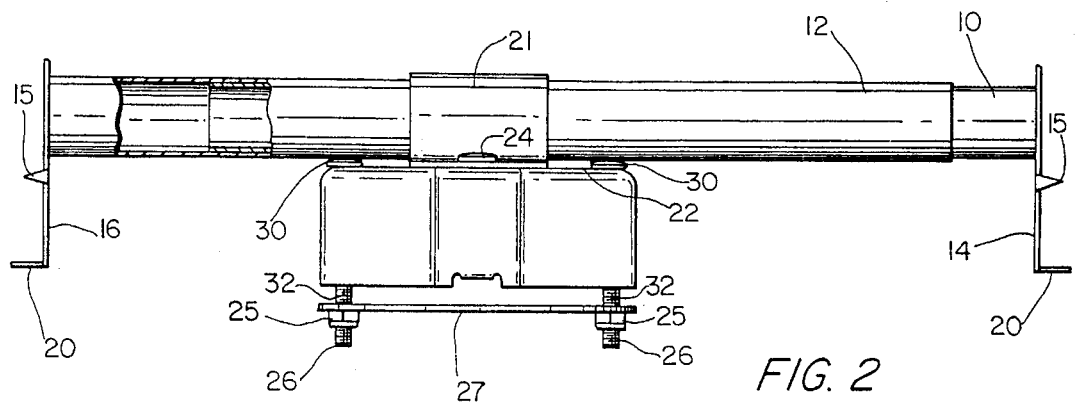
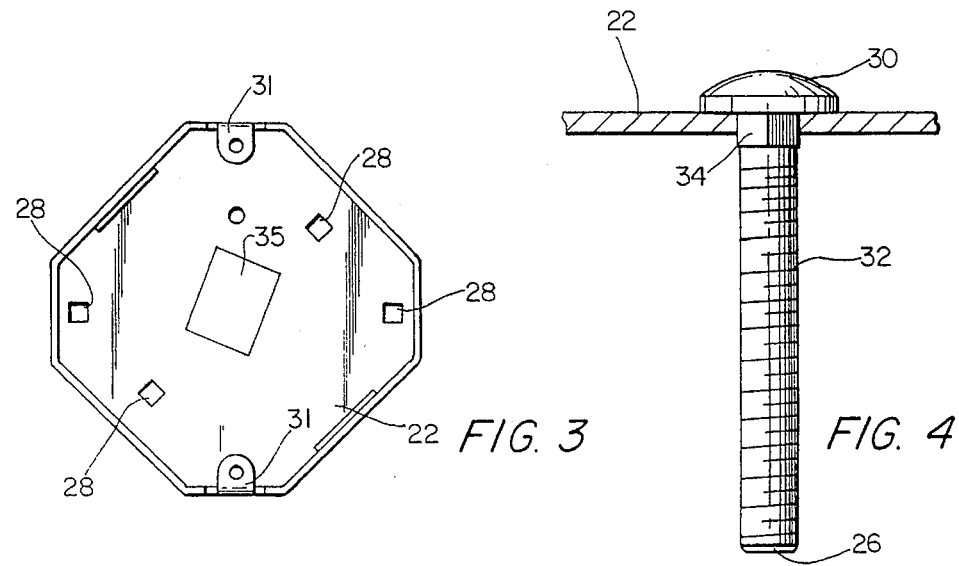

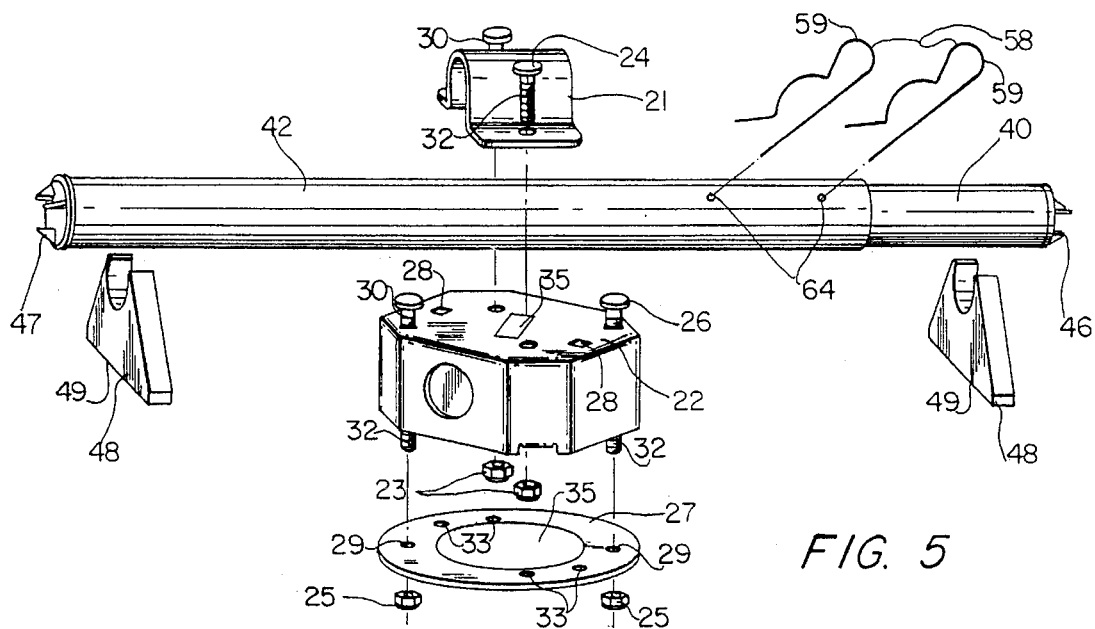
FIG. 5
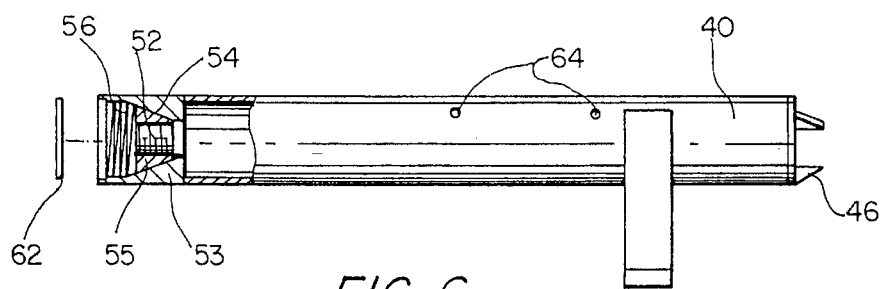
FIG. 6
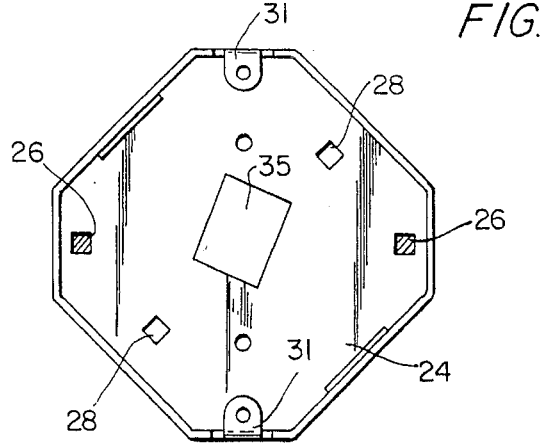
FIG. 7
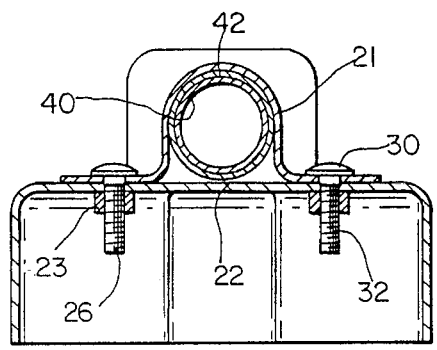
FIG. 8
FIG. 8A

ELECTRICAL OUTLET BOX FOR HANGING AN ELECTRICAL FIXTURE

This is a Continuation-In-Part application of U.S. patent Ser. No. 07/889,921, filed Jun. 3, 1992, now U.S. Pat. No. 5,303,894 the entire contents of which are hereby incorporated by reference.

BACKGROUND OF THE INVENTION

1. Field of the Invention

The present invention relates to an electric outlet box for mounting an electrical fixture, such as a fan or light, from a ceiling. More specifically, the invention relates to an outlet box having adjustable hanger screw mountings to permit mounting of a wide variety of fixtures from a ceiling by the outlet box.

2. Related Art

Prior art devices teach outlet boxes having adjustable covers and outlet boxes having adjustable fixture support means. For example, U.S. Pat. No. 1,688,518 to Bennett teaches two disks pivotally mounted at opposite corners of an outlet box. Each disk has a plurality of screw holes formed therethrough to permit angular adjustment of the cover of the box relative to the box face.

U.S. Pat. No. 3,917,899 to Oliver discloses a grounding-type electrical receptacle which utilizes a positive clamping arrangement between a strap of the receptacle and a grounded metal box to which it is attached by means of a screw-tightened grounding wedge. The receptacle fits in a box opening having arcuate ends with no protruding ears so that the receptacle can be adjusted to proper vertical or horizontal alignment.

U.S. Pat. No. 2,349,003 to Renner discloses a threaded tubular member mounted on a projecting arm. As the arm is threaded, it is possible to adjustably position the tubular member to any height for mounting a fixture or the like, even if the box is not properly located.

U.S. Pat. No. 1,991,160 to Knight discloses means for securing an extension to a junction box. A link-like element is pivotally secured between the low box and a slot in the upper extension box section.

U.S. Pat. No. 1,810,553 to Cluney discloses a threaded element that can be moved within an adjustable box for positioning a fixture to be attached thereto.

U.S. Pat. No. 746,316 to Ercanbrack discloses a ceiling mount including a fixture attaching means attached to a ceiling and provided with depending screws in slots so that the screws can be adjusted or positioned according to the bracket for mounting the fixture.

Several other patents are also of interest. U.S. Pat. No. 2,921,114 to Keen discloses an electrical box with a support plate positioned in the opening of the box. The support plate has swingable elements that can pivot into engagement with the rim on the opening of the box.

U.S. Pat. No. 2,423,757 to Dedge discloses a junction box provided with arms that can be adjusted and placed to support and locate the box as required.

U.S. Pat. No. 2,002,491 to Despard teaches a face plate for a junction box that is mounted on links or strips of steel metal so that the plate can be positioned in relation to a misaligned box. Utility elements, such as switches, are fastened to the cover plate, rather than the box.

U.S. Pat. No. 1,843,054 to Weinstein teaches a strap-like element that extends beyond the edge of a junction box so that larger fixture elements may be secured thereto.

U.S. Pat. No. 1,275,725 to Newton discloses an adjustable means for securing a switch plate to a junction box.

U.S. Pat. No. 862,380 to Baron discloses a junction box cover having retaining slots for positioning the cover on the box and U.S. Pat. No. 855,155 to Baron discloses a box having an adjustable cover plate provided with wing-like elements. A retaining ring secures the cover in any desired position.

U.S. Pat. No. 699,215 to Müller discloses a fixture box having an adjustable member that can be moved into position and fixed into position by screws.

The prior art devices do not allow simple, quick mounting of a variety of fixtures by an outlet box. Therefore, it is desirable to provide an outlet box that allows a variety of fixtures to be mounted quickly and easily to the box.

SUMMARY OF THE INVENTION

In a first embodiment of the invention, a pair of inner and outer telescopic tubes are manually positioned between a pair of parallel wooden ceiling members, such as rafters, joists, or studs, and then the outer end of each tube is secured to an adjacent ceiling member. Flat end plates at the ends of the tubes position the hanger by means of spikes that are hammered into the ceiling member adjacent to each end plate and out-turned lips that underlie the ceiling member adjacent to each end plate. Screws are then used to permanently fix the hanger in place. This model is best used in an open ceiling.

A second embodiment for working through a hole in a ceiling utilizes the combination of an interconnecting buttress threaded rod and a spring to instantly expand a pair of inner and outer telescopic tubes between a pair of parallel wooden ceiling members, such as rafters, joists, or studs, so the outer end of each tube meets an adjacent ceiling member. The tubes are prevented from expanding during shipping and installation by means of one or more safety clips which are removed after the tubes are inserted through the ceiling hole and aligned perpendicular to the parallel ceiling rafters, joists, or studs.

The present invention is directed toward a third embodiment providing an electric outlet box for mounting a wide range of electrical fixtures from a ceiling by the outlet box. The box can be secured to the outer tube of the hanger of either the first or second embodiment of the invention by a strap plate. Preferably, the box has a closed top with four circular or non-circular holes therethrough that are centered with respect to the box side wall and configured to accept fasteners, such as bolts, a continuous side wall, and an open bottom.

Adjustable hanger screw mountings that permit the mounting of a wide variety of fixtures by the outlet box are pivotally attached to opposite sides of the inner surface of the box top by fasteners. Preferably, the fasteners are inserted through bolt holes in the strap plate and two of the box top holes so that the fasteners are centered with respect to the box side wall. Each mounting is slightly arcuate in shape and extends outwardly of either side of its fastener. The curved outer edge of the mountings provides clearance with respect to the adjacent box side wall as the mountings pivot about their fasteners. Holes formed through the mountings at opposite ends of the mountings are configured to receive fixture mounting fasteners, such as carriage bolts. The box top also has a circular or non-circular top knockout to allow use of a special bracket for drop (suspended) ceilings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 is an exploded view of the first embodiment of the invention;

FIG. 2 is an elevational view of the first embodiment, part in section;

FIG. 3 is a view of the electrical box;

FIG. 4 is an enlarged detail of a non-circular hole and carriage bolt;

FIG. 5 is an exploded view of the second embodiment of the invention;

FIG. 6 is an elevational view of the second embodiment of the invention, part in section;

FIG. 7 is a view like FIG. 3 but showing the carriage bolts in section;

FIG. 8 is a section of the electrical box according to the first embodiment of the invention;

FIG. 8a is a section of the electrical box according to the second embodiment of the invention;

PREFERRED EMBODIMENT OF THE INVENTION

Figure 9:
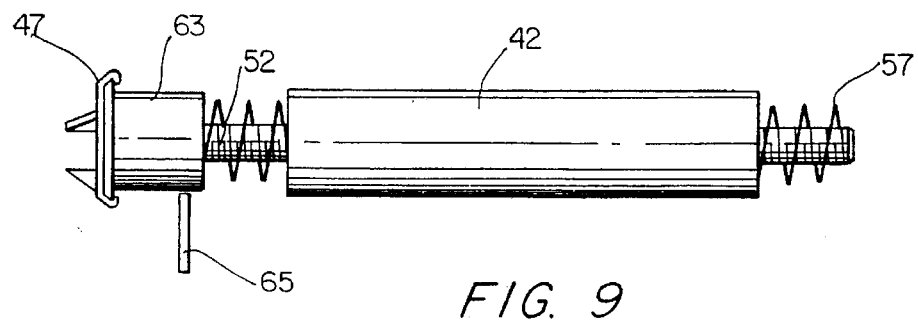
FIG. 9 is an exploded view of the second embodiment of the invention.
Figure 10:
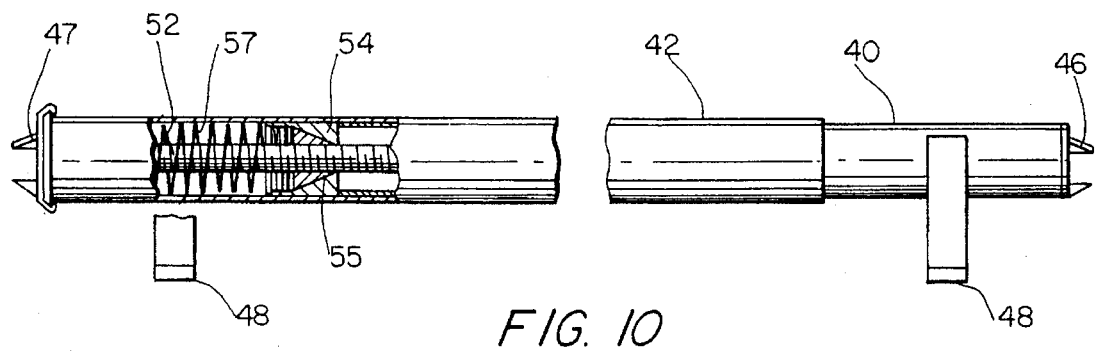
FIG. 10 is an elevational view of the second embodiment of the invention, part in section.
Figure 11:
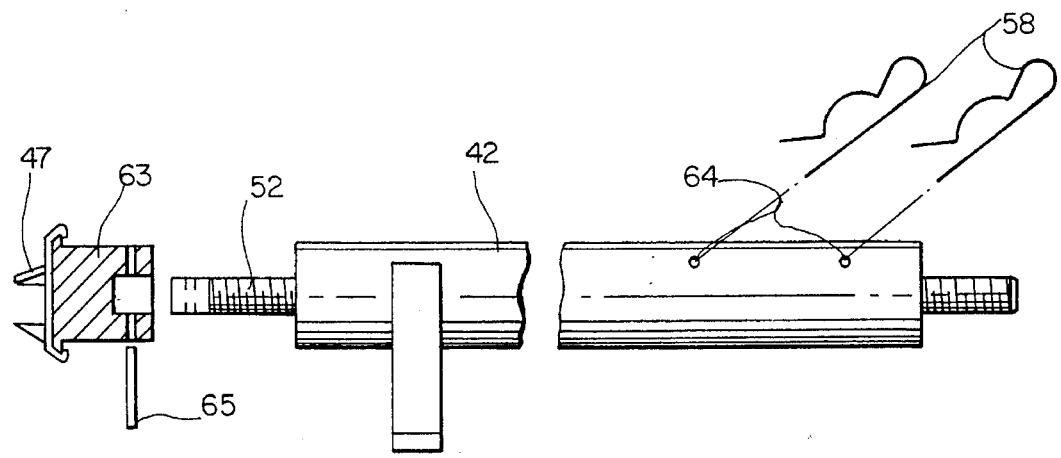
FIG. 11 is an elevational view of the second embodiment of the invention.
Figure 12:
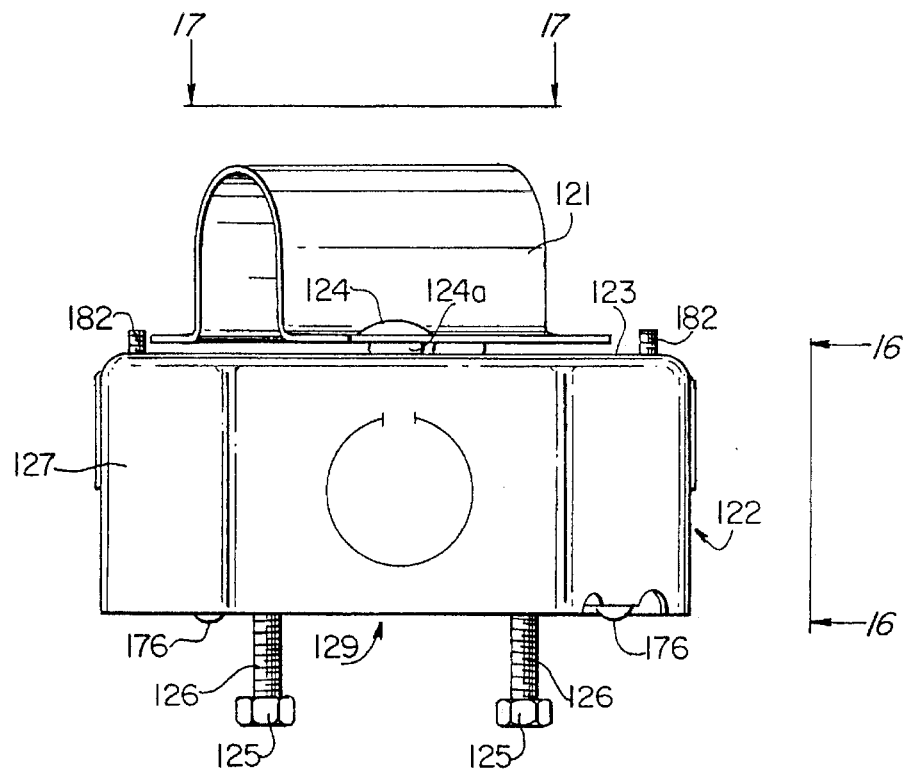
FIG. 12 is an elevational view of the third embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIGS. 1 and 2, illustrating the first embodiment of the invention, show inner and outer telescopic tubes indicated at 10 and 12, respectively, with nothing inside the tubes to hold them in position. First and second flat end plates 14, 16 are affixed to the outer ends of inner and outer tubes 10, 12, respectively, at right angles to the lengths of the tubes. Flat end plates 14, 16 have spikes 15 for engaging a pair of first and second wooden ceiling members, such as rafters, joists, or studs, which are adjacent to end plates 14, 16 and parallel to each other. Initially, first end plate 14 is hammered into position between the parallel ceiling members by hammering spikes 15 of first end plate 14 into the first ceiling member (not shown) adjacent to first end plate 14. This process is repeated with second opposite end plate 16 and the second ceiling member (not shown) that is adjacent to second end plate 16 and parallel to the first ceiling member. Wood screws 18 are then installed through corresponding apertures 19 in first and second end plates 14, 16 into the adjacent first and second ceiling members, respectively.

Each end plate 14, 16 has at its lower edge an out-turned lip 20 to place under an adjacent ceiling member to ensure correct height positioning of hanger tubes 10, 12. Apertures 19 are positioned on end plates 14, 16 to allow clearance of an electric drill head, so screws 18 can be screwed in flat against end plates 14, 16. Thus, the hanger is very easy to utilize in an open ceiling structure by holding it in place with the lips 20 up against the wooden ceiling members with one hand and hammering in spikes 15 to temporarily secure end plates 14, 16 before permanently securing them with wood screws 18 through plate apertures 19. Alternatively, the hanger may be used for above-the-ceiling (attic) installation with out-turned lips 20 broken off, bent back, or slid under the wooden ceiling members. In either case, the-bottom edges of end plates 14, 16 provide for correct positioning and spacing of tubes 10, 12 and outlet box 22 can be mounted to tubes 10, 12 by a strap plate 21.

As shown in FIGS. 1 and 5, electric box 22 is held to a strap plate 21 cradling outer tube 12 by carriage bolts 24 and locknuts 23. Alternatively, strap plate 21 is a flange with side wings 17 and can be attached to box 22 by inserting side wings 17 into slots in opposing walls of the box (not shown).

The top of box 22 is provided with non-circular holes 28 to receive long carriage bolts 26. After electrical work is done, the open bottom of box 22 is closed by fastening a plate or pan 27 to it by inserting carriage bolts 26 through bolt holes 29 and securing bolts 26 with nuts 25. Plate 27 also has bolt holes 33 for securing an object to the hanger assembly. The box bolt hole positioning allows heads 30 of carriage bolts 26 to be captured under tube 12 or strap plate 21 to prevent carriage bolts 26 from being pushed up out of holes 28 during plate installation. The top of box 22 has non-circular holes 28 at 45 and 90 degrees to the "ears" 31 of the box to allow for different size brackets and four point mounting of heavy light fixtures and to provide direct linear support directly under tubes 10, 12. As shown in FIG. 4, carriage bolts 24, 26 have rounded heads 30, threads 32, and non-circular portions 34 to fit non-circular holes 28 and prevent rotation of the bolts 24, 26 for easier application of nuts 23, 25 from below box 22 or plate 27, respectively.

The second embodiment of the invention is more easily installed than the first embodiment when working through a small hole in the ceiling.

As shown in FIGS. 5, 6, 9, 10, and 11, the second embodiment includes telescopic tubes 40, 42 which are like tubes 10, 12 except they have end spikes 46, 47 instead of flat plates 14, 16 and a screw mechanism to expand tubes 40, 42. Interconnecting buttress threaded rod 52 is attached to end plug 63 with roll pin 65. Buttress threaded rod 52 is then inserted into outer tube 42 and end plug 63 is pressed in place. This leaves buttress threaded rod 52 inside outer tube 42 and unable to rotate inside outer tube 42. Inner tube 40 has a conical seat 53 that fits the conical shape of two buttress thread half nuts 54, 55 which surround buttress threaded rod 52. Spring 57 pushes half nuts 54, 55 into conical seat 53 as tubes 40, 42 are expanded during installation. Thus, as tube 42 is pulled away from tube 40 during expansion of tubes 40, 42, spring 57 pushes buttress half nuts 54,55 into conical seat 53, allowing half nuts 54, 55 to separate within conical seat 53. This is facilitated by the angled surface of buttress threaded rod 52. As half nuts 54, 55 separate, buttress threaded rod 52 pulls through the half nuts 54, 55.

The second embodiment includes a fender washer 62 which holds spring 57 in place, as shown in FIG. 6. Alternatively, spring 57 can be held in place by a retainer (not shown).

Preferably, tube 40 is screwed into tube 42 as far as possible and spring 57 is captured and compressed inside outer tube 42 between fender washer 62 and end plug 63. During installation, removal of one or more safety pins 58 from corresponding holes 64 punched in both tubes 40, 42 releases the spring's tension, driving the tubes away from each other and towards parallel ceiling members, thereby allowing instant lateral expansion of tubes 40, 42. Stands 48 are slightly larger than tubes 40, 42 to allow fast lateral movement of the tubes when the spring's tension is released.

Thus, the hanger is placed through a hole in the ceiling or wall (not shown), placed between a pair of first and second parallel wooden ceiling members (not shown), and tubes 40, 42 are instantly laterally expanded by removing safety clips 58 from holes 64 in tubes 40, 42 to release the tension in spring 57. Outer tube 42 is then rotated manually to exert enough pressure to force spikes 46, 47 completely into the first and second ceiling members adjacent to spikes 46, 47, respectively. Spikes 47 are free to rotate on tube 42, thereby allowing spikes 47 to enter the second adjacent wooden ceiling member in a straight line as tube 42 rotates. The pressure from spring 57 as tubes 40, 42 are rotated and expanded forces buttress half nuts 54, 55 into conical seat 53, locking the buttress half nuts 54, 55 together and making them act as any tapped nut.

In an alternate embodiment, safety clips 58 are provided with one or more loops (not shown) so that clips 58 can be removed from holes 64 of tubes 40, 42 by inserting a finger into each loop and pulling downward to remove clips 58, thereby releasing the tension of spring 57 and extending tubes 40, 42.

The height position of the hanger is determined by bottom edges 49 of infinitely laterally adjustable support stands 48, which snap onto and cradle tubes 40, 42 while resting on the ceiling. Stands 48 are adjustable so that debris found remaining in the ceiling, especially lath ceilings, can be easily cleared away from the hanger.

The construction and operation of the second embodiment is the same as the first; same box, same carriage bolts 26, etc.

According to a third embodiment of the invention as illustrated in FIGS. 12 through 17, electrical outlet box 122 includes a top 123 having an outer surface 123a and an inner surface 123b, a continuous side wall 127, an open bottom 129, and adjustable hanger screw mountings 170 pivotally attached to inner surface 123b of box top 123 at opposite sides of box 122.

Strap plate 121 can be attached to outer tube 12 or outer tube 42 of the first or second embodiment of the invention, respectively. Fasteners 124 connect strap plate 121 to outer surface 123a of box top 123 and pivotally attach mountings 170 to inner surface 123b of box top 123.

Figure 15:
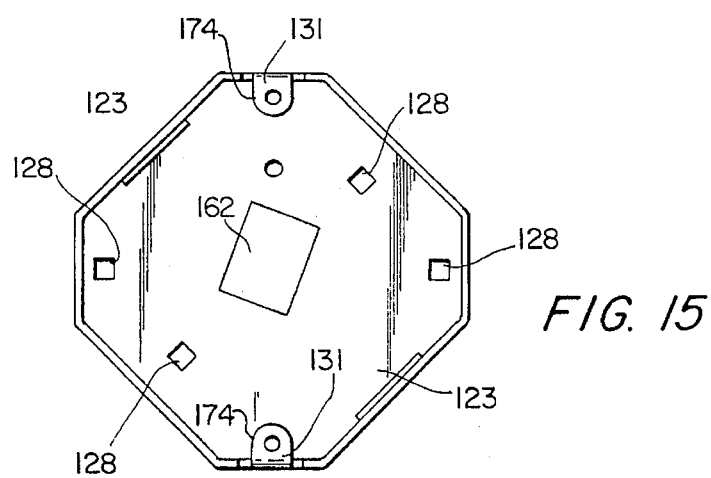
FIG. 15 is a top view of an alternate embodiment of the third embodiment of the invention.

Preferably, fasteners 124 are bolts, such as carriage bolts, having a non-circular upper portions (not shown), and box top 123 is provided with a plurality of non-circular holes 128, as shown in FIG. 15, corresponding to the non-circular upper portions of fasteners 124. Thus, the non-circular upper portions of fasteners 124 engage non-circular holes 128 to prevent rotation of fasteners 124.

Figure 13:
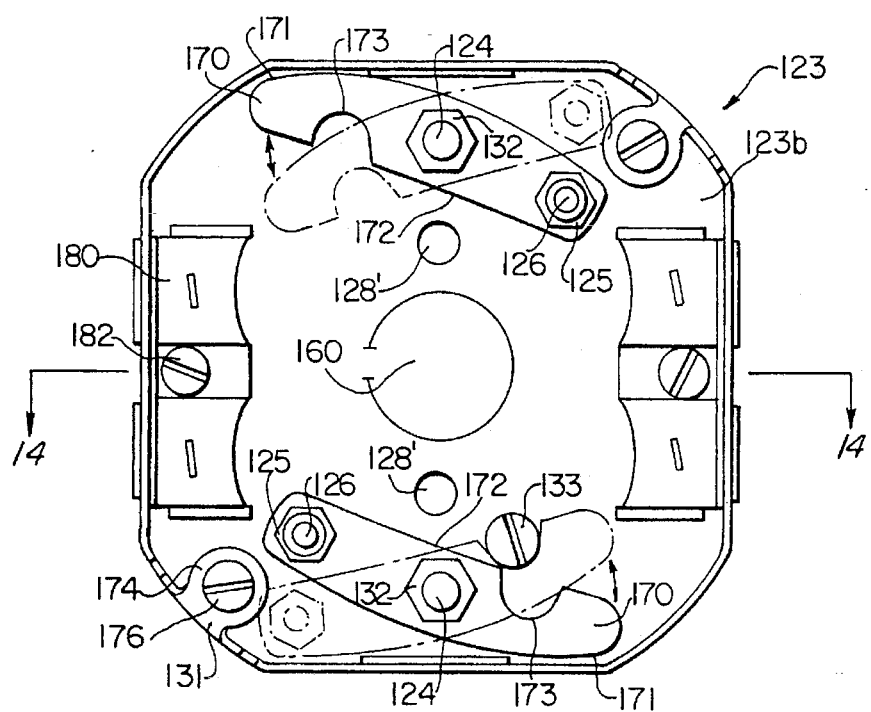
FIG. 13 is a bottom view of the third embodiment of the invention.
Figure 14:
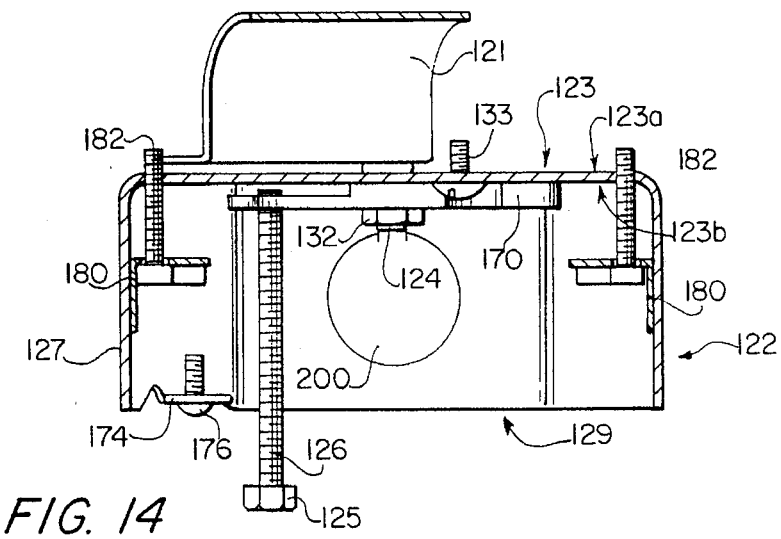
FIG. 14 is a cross-sectional view of the third embodiment of the invention taken along line 14—14 of FIG. 13.
Figure 16:
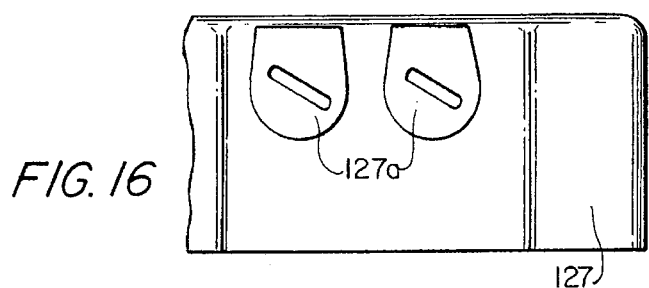
FIG. 16 is a view taken along line 16—16 of FIG. 12.

Alternatively, as shown in FIG. 13, box top 123' can be provided with a plurality of circular holes 128' configured to receive fasteners 124, such as bolts, for fastening strap plate 121 to outer surface 123a of box top 123'. "O" rings 124a are preferably provided between fasteners 124 and outer surface 123a of box top 123 or 123'.

Figure 17:
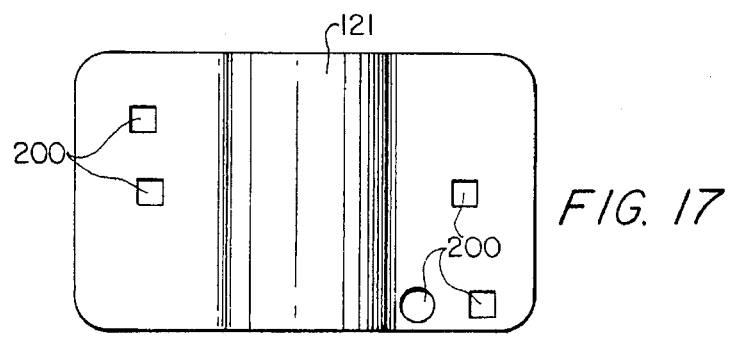
FIG. 17 is a view taken along line 17—17 of FIG. 12.

As shown in FIG. 17, strap plate 121 preferably has a plurality of holes 200 (which can be non-circular, as shown in FIG. 17, or can be circular) to receive fasteners 124 and allow adjustable positioning of strap plate 121 on outer surface 123a of box top 123. Preferably, holes 128 or 128' and fasteners 124 are centered with respect to box side wall 127, and fasteners 124 are secured by nuts 132.

Mountings 170 extend outwardly of either side of fasteners 124 and are rotatable about an axis defined by fasteners 124 to permit a variety of fixtures to be mounted to box 122. Mountings 170 are slightly arcuate in shape, having a curved outer edge 171 to provide clearance with respect to the adjacent box side wall 127 as mountings 170 pivot about fasteners 124. Preferably, mountings 170 are metal. Fixture mounting fasteners 126, such as carriage bolts, are attached to opposite ends of mountings 170 for mounting the fixture to mountings 170, rather than to box 122. Preferably, fasteners 126 are dimensioned so that they can be attached to any standard fixture bracket.

The variety of fixtures can be mounted to outlet box 122 by adjusting the angle of mountings 170 with respect to side wall 127 of box 122 to a desired position, securing mountings 170 in the desired position by tightening nuts 132 of fasteners 124 and mounting a fixture to mountings 170 by fasteners 126 and nuts 125. Thus, mountings 170 allow a variety of fixtures to be mounted to box 122, because mountings 170 can be adjusted to position fasteners 126 to accomodate any type of fixture.

Inner edges 172 of mountings 170 include semi-circular indentations 173 configured to avoid clash of mountings 170 with ground screw 133.

Box side wall 127 is provided at opposite sides with slots 127a configured to receive electrical wires. Brackets 180 are attached to inner surface 123b of box top 123 at the opposite sides containing slots 127a by fasteners 182, such as screws, that are centered with respect to the box side wall 127 and inserted through threaded holes 129 in box top 123. Fasteners 182 can be tightened to secure electrical wires inserted through slots 127 in place.

Preferably, box top 123 includes a circular top knockout 160, as shown in FIG. 13, or alternatively, a non-circular top knockout 162, as shown in FIG. 15, to allow use of a special bracket for drop (suspended) ceilings.

Box side wall 127 preferably includes at least one side knockout 200 to allow insertion of an object, such as rigid tubing, into box 122. Side knockout 200 can be either circular, as shown, or non-circular.

Preferably, box ears 131 include inwardly-extending tabs 174 having holes formed therein, as shown in FIGS. 3 and 7 in relation to the first and second embodiments of the invention, and configured to engage supplemental fixture fasteners 176 to provide supplemental support for the fixture.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:

1. An electrical outlet box for hanging a fixture from a ceiling, said outlet box comprising:

a top plate, with said top plate having an outer surface and an inner surface;

a side wall depending from said top plate;

a mounting arm pivotally connected to said top plate with said mounting arm in juxtapositional relationship with said top plate inner surface; and said mounting arm having means for engagement with a fixture fastener with said means for engagement being spaced from said pivotal connection between said mounting arm and said top plate such that pivotal movement of said mounting arm changes the position of said means for engagement relative to said outlet box side wall.

2. The outlet box of claim 1, wherein portions of said top plate define a hole through said top plate and said mounting arm is pivotally connected to said top plate by a fastener extending through said mounting arm and said hole in said top plate.

3. The outlet box of claim 1, wherein said mounting arm has an arcuate outer edge for providing clearance with respect to said outlet box side wall during said pivotal movement of said mounting arm.

4. The outlet box of claim 1, wherein portions of said top plate define a hole through said top plate and wherein said mounting arm includes a recess in an inner edge of said mounting arm for providing clearance around an edge of said hole on said inner surface of said top plate during said pivotal movement of said mounting arm.

5. The outlet box of claim 1, wherein portions of said side wall define an opening through said side wall for allowing the passage of an electrical wire, and said outlet box further including a bracket attached to said inner surface of said top plate for securing said electrical wire.

6. The outlet box of claim 1, wherein said side wall includes a portion that is bent at approximately a right angle to the remainder of said side wall to form an inwardly extending tongue that is substantially parallel to said top plate, with a hole defined through said tongue providing means for engagement with a supplemental fixture fastener.

7. The outlet box of claim 1, wherein said top plate includes a circular knockout.

8. The outlet box of claim 1, wherein said top plate includes a non-circular knockout.

9. An outlet box for hanging a fixture from a ceiling, said outlet box comprising:

a top plate, with said top plate having an outer surface and an inner surface;

a side wall depending from said top plate;

a mounting arm pivotally connected to said top plate in facing relationship to said top plate inner surface, said pivotal connection being intermediate opposite ends of said mounting arm and said mounting arm being centered with respect to said side wall; and said mounting arm having means for engagement with a fixture fastener with said means for engagement being spaced from said pivotal connection such that pivotal movement of said mounting arm changes the position of said means for engagement relative to said outlet box side wall.

10. The outlet box of claim 9, wherein portions of said top plate define a hole through said top plate and said mounting arm is pivotally connected to said top plate by a fastener extending through said mounting arm and said hole in said top plate.

11. The outlet box of claim 9, wherein said mounting arm has an arcuate outer edge for providing clearance with respect to said outlet box side wall during said pivotal movement of said mounting arm.

12. The outlet box of claim 9, wherein portions of said top plate define a hole through said top plate and wherein said mounting arm includes a recess in an inner edge of said mounting arm for providing clearance around an edge of said hole on said inner surface of said top plate during said pivotal movement of said mounting arm.

13. The outlet box of claim 9, wherein portions of said side wall define an opening through said side wall for allowing the passage of an electrical wire, and said outlet box further including a bracket attached to said inner surface of said top plate for securing said electrical wire.

14. The outlet box of claim 9, wherein said side wall includes a portion that is bent at approximately a right angle to the remainder of said side wall to form an inwardly extending tongue that is substantially parallel to said top plate, with a hole defined through said tongue providing means for engagement with a supplemental fixture fastener.

15. The outlet box of claim 9, wherein said top plate includes a circular knockout.

16. The outlet box of claim 9, wherein said top plate includes a non-circular knockout.

17. An outlet box for hanging a fixture from a ceiling, said outlet box comprising:

a top plate, with said top plate having an outer surface and an inner surface;

a mounting bracket attached to said outer surface of said top plate;

a side wall depending from said top plate;

a mounting arm pivotally connected to said top plate with said mounting arm in juxtapositional relationship with said top plate inner surface, said pivotal connection being effected by a fastener that also serves as means for attachment of said mounting bracket to said outer surface of said top plate; and said mounting arm having means for engagement with a fixture fastener with said means for engagement being spaced from said pivotal connection between said mounting arm and said top plate such that pivotal movement of said mounting arm changes the position of said means for engagement relative to said outlet box side wall.

18. The outlet box of claim 17, wherein portions of said top plate define a hole through said top plate and said mounting arm is pivotally connected to said top plate by said fastener extending through said mounting arm, said hole in said top plate, and said mounting bracket.

19. The outlet box of claim 17, wherein said mounting arm has an arcuate outer edge for providing clearance with respect to said outlet box side wall during said pivotal movement of said mounting arm.

20. The outlet box of claim 17, wherein portions of said top plate define a hole through said top plate and wherein said mounting arm includes a recess in an inner edge of said mounting arm for providing clearance around an edge of said hole on said inner surface of said top plate during said pivotal movement of said mounting arm.

21. The outlet box of claim 17, wherein portions of said side wall define an opening through said side wall for allowing the passage of an electrical wire, and said outlet box further including a bracket attached to said inner surface of said top plate for securing said electrical wire.

22. The outlet box of claim 17, wherein said side wall includes a portion that is bent at approximately a right angle to the remainder of said side wall to form an inwardly extending tongue that is substantially parallel to said top plate, with a hole defined through said tongue providing means for engagement with a supplemental fixture fastener.

23. The outlet box of claim 17, wherein said top plate includes a circular knockout.

24. The outlet box of claim 17, wherein said top plate includes a non-circular knockout.

\* \* \* \* \*